United States Patent [19]

Nakagawa et al.

[11] Patent Number: 4,516,234
[45] Date of Patent: May 7, 1985

[54] OPTICAL RECORDING SYSTEM

[75] Inventors: Shiro Nakagawa; Akihiko Kuroiwa, both of Tokyo, Japan

[73] Assignee: TDK Electronics Co., Ltd., Tokyo, Japan

[21] Appl. No.: 383,556

[22] Filed: Jun. 1, 1982

[30] Foreign Application Priority Data

Jun. 24, 1981 [JP] Japan ................................. 56-96759

[51] Int. Cl.³ ............................................. G11B 7/00
[52] U.S. Cl. ..................................... 369/109; 369/275
[58] Field of Search ..................... 346/762; 358/342; 369/43, 111, 116, 275, 109, 276, 126

[56] References Cited

U.S. PATENT DOCUMENTS

| | | | |
|---|---|---|---|
| 4,161,752 | 7/1979 | Basilico | 369/275 |
| 4,176,377 | 11/1979 | Howe | 358/342 |
| 4,241,120 | 12/1980 | Datta et al. | 369/276 |
| 4,283,785 | 8/1981 | Miyauchi et al. | 369/116 |
| 4,320,489 | 3/1982 | Crandall et al. | 369/275 |
| 4,327,430 | 4/1982 | Wada et al. | 369/43 |
| 4,359,750 | 11/1982 | Howe | 369/275 |

Primary Examiner—Donald McElheny, Jr.
Attorney, Agent, or Firm—Collard, Roe & Galgano

[57] ABSTRACT

An optical recording system for high recording density has been found for a system which uses a heat-meltable recording medium which is melted by illuminating the same with a laser beam according to the data to be stored. The spacing between adjacent pits on the recording medium is less than the diameter of the laser beam, and then, each pit overlaps partially with the succeeding pit on the recording medium. In spite of the overlap of the pits, the recorded data can be read out by reading only the non-overlapped portion of the bank of a pit. The spacing between the pits is preferably in the range between ⅓ and ½ of the diameter of the laser spot so that the recording density is at least two times as high as a prior recording medium.

5 Claims, 12 Drawing Figures

Fig. 3A
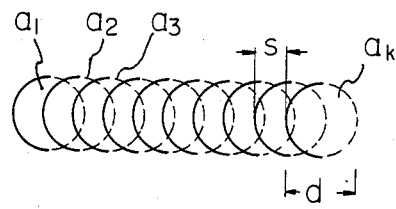
Fig. 3B
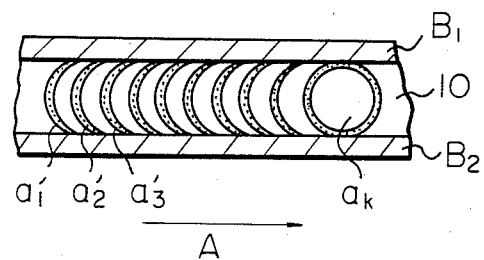
Fig. 4A              Fig. 4B
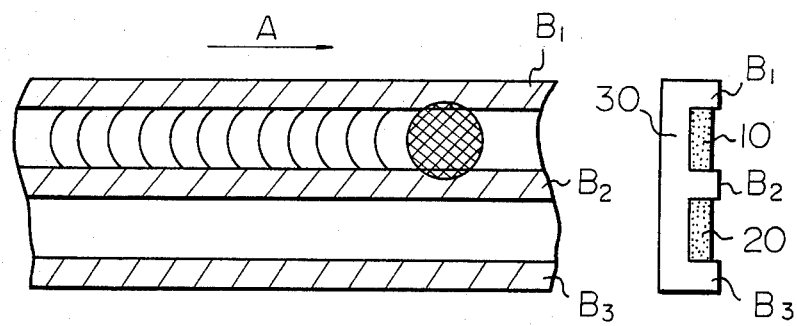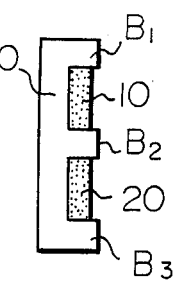

OPTICAL RECORDING SYSTEM

BACKGROUND OF THE INVENTION

The present invention relates to the improved system for an optical recording/reproducing system, in particular, it relates to such a system which records information with extremely high density. The present invention is applied to a heat mode optical recording system, in particular, an erasable optical recording system in which a heat meltable plastic, like styrene is used as a recording medium.

In a heat meltable plastic medium, data is stored by producing a pit on a medium by melting the same by illuminating the surface of the plastic with a laser beam. That plastic medium has the advantage that an erasable recording is possible like a conventional magnetic recording system.

Plastics having main component styrene melt in high temperature. When that meltable plastic is used as a memory medium, data is stored in that medium by illuminating the surface of the plastic with a thin laser beam to provide a pit on the surface of the same. Thus, the presence of a pit shows that the data "1" is stored, and the non-existence of a pit shows that the data "0" is stored. That data stored in the plastic is read out by illuminating the surface of the same with a weak laser beam, which reflects irregularly or regularly according to the presence or non-presence of a pit, and then, the beam reflected at a pit can indicate whether the data stored in the plastic is "1" or "0".

The data thus stored is erased by melting the surface selectively by illuminating the same with a thick and strong laser beam, and cancelling a pit. When a pit is cancelled, new data can be stored again at that portion where a pit existed. Therefore, meltable plastic is an erasable optical memory medium, which can store data repetitively, like a conventional magnetic recording system.

Our previous U.S. patent application Ser. No. 362,983 filed on Mar. 29, 1982 handles that kind of optical recording system.

A conventional heat meltable optical recording system is described in accordance with FIGS. 1A and 1B, and FIGS. 2A through 2C, for the easy understanding of the present invention.

FIG. 1A and FIG. 1B show the structure of an erasable optical recording medium, which can be implemented for instance by a plastic having the main component of styrene. In FIG. 1A, the reference numeral 20 shows a substrate which is for instance acrylic resin or glass, 22 is a thin film of a plastic recording medium which is composed of a plastic in which the main component is styrene. Preferably, that recording medium is styreneoligomer which includes some dye (for instance "Oleosol first blue EL"), for absorbing optical energy sufficiently.

When the surface of that recording medium is heated selectively with a laser beam, the heated portion is melted and a pit is produced. A pit is shaped as shown by the reference numeral 26 having a ring-shaped circumferential bank 26a, and a circular flat portion 26b surrounded by the ring 26a (see FIG. 1B), because of the surface tension effect of the melted liquid and the flow of said liquid outside of a pit. After a pit is cooled, that pit shows that the data "1" is stored. That concaved pit corresponds to the data "1", and the non-existence of a pit corresponds to a data "0".

In order to facilitate the reproduction of a pit, or an erasable recording, a thin plastic film 26b must exist at the bottom of a pit, that is to say, the substrate 20 must not be exposed in air at the portion of a pit. In order to assure that the substrate 20 is covered with a plastic film at the portion of a pit, the thickness (t) of the recording medium 22 must be greater than the diameter (d) of a pit, and preferably, that thickness (t) is greater than 3 μm. It should be appreciated that the heat conductivity of a styrene polymerization product with low degree is small, and therefore, a pit can be produced with a relatively low energy density even when the thickness (t) of the medium 22 is large.

If the thickness (t) is smaller than the above value, the affinity between the substrate and the recording medium must be greater than the surface tension of the melted recording medium, in order to assure that the substrate 20 is not exposed to air at the bottom of a pit. The preferable combination of the substrate and the recording medium for satisfying the above condition is that the recording medium is styrene-oligomer, and the substrate is acrylic resin or glass. If the above condition is satisfied, the bottom of a pit does not expose the substrate to air even when the recording medium is melted till the bottom of the pit, since the substrate is wet by the melted recording medium, and when the ring 26a is melted afterwards, the pit is cancelled for the next recording. If the above condition is not satisfied, the melted recording medium is shaped like a ball by the surface tension effect, and a pit can not be cancelled, thus, an erasable recording would be impossible.

The data stored in a pit is read out by illuminating the surface of the recording medium with a weak laser beam, and detecting the reflected beam from the surface. When no pit exists, no irregular reflection occurs, and therefore, the incident angle of an input beam is equal to that of an output beam, then, a photo-detector positioned in the incident angle of the output beam can only detect a beam. On the other hand, when a pit exists, an irregular reflection occurs, and the photo-detector does not detect a beam. Thus, a photo-detector can provide output data.

The recording, reading and erasing of data is described more in detail in accordance with FIGS. 2A through 2C.

The recording is accomplished by illuminating the surface of the recording medium with a laser beam having the diameter of 1-2 μm (for instance, the power of that laser beam is 5 mW), and produces pits 26A, 26B, 26C, and 26D (see FIG. 2A).

The erasure or cancellation of data is accomplished by illuminating a pit and its peripheral portion with a laser beam or an LED beam (light emission diode beam). It is supposed that the diameter of a beam for erasing data is three times as large as that of a pit. When a plastic is heated by that beam, the recording medium is melted, and a pit is cancelled and is filled with melted plastic. The reference numeral 26B in FIG. 2B shows an erased pit.

When the erased portion is illuminated again by a laser beam with the diameter of 1-2 μm, a pit is generated again and new data is stored. The reference numeral 26E in FIG. 2C shows a new pit.

Since the cancellation and/or the regeneration of a pit are repeatable, an erasable optical recording is accomplished by using a plastic, as a conventional magnetic recording system does. Further, an optical recording has the advantages of low noise.

However, a prior optical recording system as described in accordance with FIGS. 1A, 1B, and FIGS. 2A through 2C has the disadvantage that the recording density is not enough, that is to say, the quantity of data stored in the predetermined area of a recording medium is not relatively sufficient. That low recording density of the prior art comes from the fact that a pit is circular occupying some area (see FIG. 1B), and that a laser beam for providing a pit is not a complete spot, but has some power distribution, that is to say, when a laser beam illuminates a pit, the peripheral portion of that pit is also illuminated, and therefore, that peripheral portion can not be used for storing another pit in order to keep the necessary resolution.

SUMMARY OF THE INVENTION

It is an object, therefore, of the present invention to overcome the disadvantages and limitations of a prior optical recording system by providing a new and improved optical recording system.

It is also an object of the present invention to provide an optical recording system which can store data with high density.

The above and other objects are attained by an optical recording system comprising a laser beam source; modulation means for modulating the intensity of the laser beam of said laser beam source; separation means which passes the beam from said laser beam source but separates a reflection beam in the opposite direction; means for converting optical energy to electrical energy to provide reproduced signal according to the separated reflection beam from said separation means; focusing lens for focusing the beam on the surface of the recording medium; wherein said recording medium is made of heat-meltable material which is melted by illuminating a laser beam stronger than the threshold value to provide a pit corresponding to data to be stored; and wherein relative movement of said recording medium to the laser beam is such that the spacing between each adjacent pit on the recording medium is less than a diameter of a laser beam, which is defined by the threshold value of the energy of the laser beam for melting the recording medium.

BRIEF DESCRIPTION OF THE DRAWINGS

The foregoing and other objects, features, and attendant advantages of the present invention will be appreciated as the same become better understood by means of the following description and accompanying drawings wherein;

FIGS. 4A and 4B show the modification of the recording track.

DESCRIPTION OF THE PREFERRED EMBODIMENTS

Figure 1A:
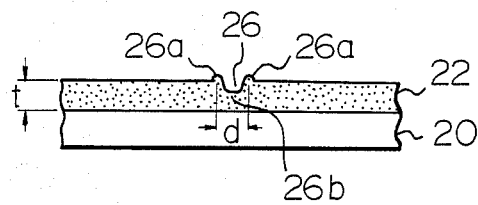
FIGS. 1A and 1B show an erasable recording medium for the basic background explanation of the present invention.

FIGS. 3A and 3B show the enlarged view of the record pits, in which the reference numeral 10 is a recording track made of heat meltable material like styreneoligomer, $B_1$ and $B_2$ are edges of the recording track 10 and those edges are made of the same material as that of the substrate, which is for instance glass or acrylic resin.

In those figures, the first pit $a_1$ at the extreme left end is produced first to store data, then, the second pit $a_2$ which is apart from the first pit $a_1$ by the length s is produced, where the length s is less than the diameter d of a pit. It should be noted that when the second pit $a_2$ is produced, the right half portion of the first pit $a_1$ is deleted as shown by the dotted line in FIG. 3A, and the left half portion of the second pit is produced at the portion where the deleted right half portion of the first pit $a_1$ existed. Similarly, the succeeding pits $a_3$, $a_4$, ... are produced so that the duration s between pits is less than the diameter of a pit, and the right halves of those pits are deleted by the next succeeding pits. Accordingly, the non-deleted portion ($a_1'$, $a_2'$, $a_3'$, ...) of the pits has the information whether the stored data is "1" or "0". Of course, the presence of the bank ($a_1'$, $a_2'$, $a_3'$, ...) shows that the data is "1", and the non-presence of that bank shows that the data is "0".

Preferably, the duration or the period s between the two pits is in the range between $\frac{1}{3}$ and $\frac{1}{2}$ of the diameter of a pit for providing enough recording density and the correct read-out of the presence of a pit. When the period s is less than $\frac{1}{3}$ of the diameter of a pit, the banks of the two adjacent pits are sometimes overlapped, and the correct read-out of each of the pits would be impossible.

It should be appreciated that the diameter of a pit is almost equal to the diameter of a laser beam. Since the power of a laser beam has some distribution, the diameter of a pit is defined by the power density of a laser beam within the diameter, which is determined by the threshold power for melting recording medium.

FIGS. 4A and 4B show the alternative of the embodiment of FIGS. 3A and 3B, in which a pair of recording channels 10 and 20 are provided in parallel, and those channels are bordered by the edges $B_1$, $B_2$ and $B_3$. Those edges $B_1$, $B_2$ and $B_3$ are made of the same material as that of the substrate 30. Preferably, the confronting edges ($B_1$ and $B_2$, or $B_2$ and $B_3$) define a concaved channel, and the recording medium is fixed in that concaved channel. The embodiment of FIGS. 4A and 4B is advantageous for producing and/or reading-out banks ($a_1'$, $a_2'$, $a_3'$, ...) because of the presence of the projected edges or the concaved channels.

Concerning a laser beam for producing a pit, it is preferable that the cross section of the beam is circular, and the power of the beam is completely concentrated in the circle, but has no power outside of the circle. However, an actual semiconductor laser has an elliptic cross section as shown in FIG. 5A, and the energy of a semiconductor laser distributes as shown in FIG. 5B, where the vertical axis shows an energy density, and the horizontal axis shows the length L along the major axis.

Figure 5A:
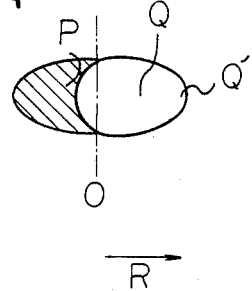
FIG. 5A shows the shape of the beam of a semiconductor laser.

When a semiconductor laser is used for producing a pit in the present invention, it is preferable that a beam moves in the direction R of FIG. 5A along the major axis of the ellipse, and still preferably, the rear end P (hatched portion in FIGS. 5A and 5B) of the beam is shadowed by using an iris diaphragm. With the use of an iris, the border of beam is clarified, and then, the border of a pit is also clarified to prevent the read-out error of data or improve the resolution power.

Figure 5B:
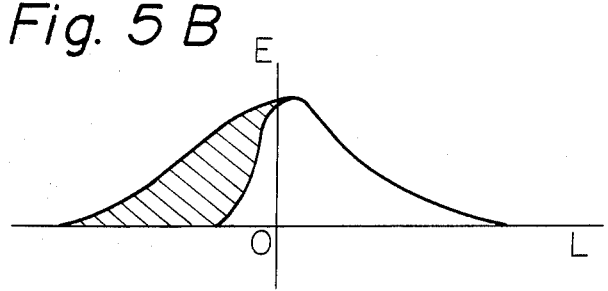
FIG. 5B shows the curve of the distribution of the energy of a semiconductor laser.

It should be noted in FIGS. 5A and 5B that a beam spot is elongated in the moving direction of the relative movement of the beam spot. The elongated portion Q' of the beam functions to pre-heat the recording medium, and that pre-heat increases substantially the effective power of a laser beam. Therefore, it should be appreciated that an elliptic beam of a semiconductor laser is advantageous for the present optical recording system, although that elliptic shape of a beam is the disadvantage in a prior optical recording system because the weak power at the peripheral portion has a border of a pit obscured, and/or reduced the resolving power.

As described above, according to the present invention, the recording period between pits is less than the diameter of a pit, or a laser spot, and therefore, the recording density is considerably increased as compared with that of a prior art. When the recording period s is one-third of the diameter d, the recording density is at least three times as high as a prior optical recording system.

Figure 1B:
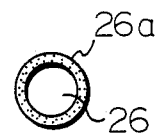
Figure 2A:
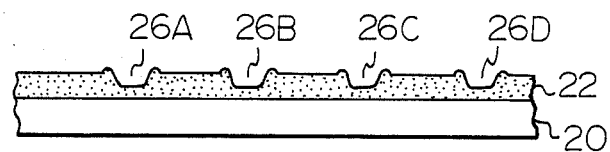
FIGS. 2A through 2C show the operation of the erasable recording medium of FIGS. 1A and 1B, FIGS. 3A and 3B show the configuration of the pits provided on the recording medium according to the present invention.
Figure 2B:
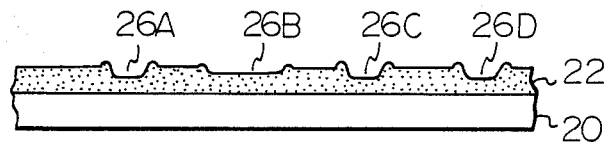
Figure 2C:
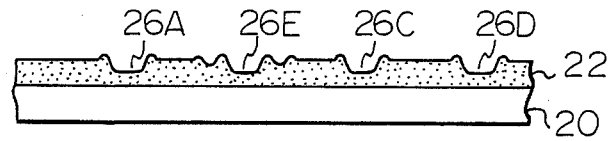
Figure 6:
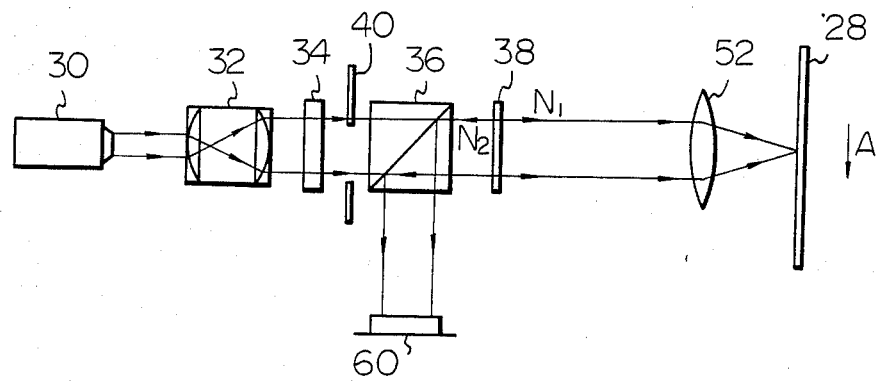
FIG. 6 shows a structure of the optical recording system according to the present invention.

FIG. 6 shows the structure of the optical recording system according to the present invention. In the figure, the reference numeral 28 is an optical recording medium described in accordance with FIGS. 1A and 1B, and that medium moves along the arrow A. The reference numeral 30 is a He-Ne laser (helium-neon laser), 32 is a collimate lens, 34 is an optical modulator for providing an intensity modulation to the beam according to the data to be stored, 36 is a beam splitter, which passes the original beam but splits the reflection beam in the opposite direction, 38 is a quarter wavelength plate having the thickness of ¼ wavelength of a beam of a laser. The numeral 52 is a focus lens, 60 is a photo-detector for converting optical energy to an electrical energy, and 40 is an iris diaphragm or an opening for shadowing the rear portion of the beam as described in accordance with FIGS. 5A and 5B.

The operation of the apparatus of FIG. 6 is as follows.

The light beam generated by the He-Ne laser 30 is collimated by the lens 32, and the intensity of the beam is modulated by the optical modulator 34 according to the information to be recorded. The modulation is the amplitude modulation or the intensity modulation. The output beam $N_1$ of the optical modulator 34 illuminates the small area (for instance, the diameter of the area is 1 $\mu$m) on the medium 28 through the iris diaphragm 40, the beam splitter 36, the quarter wavelength plate 38, and the lens 52. The lens 52 focuses the beam on the recording medium 28. Thus, the beam according to the data to be stored is focused on the recording medium 28, and the pit according to the data is produced on the medium 28.

When the data on the medium 28 is read out, the output power of the laser 30 is weakened. The weakened beam from the laser 30 illuminates the medium 28, which reflects the beam. The reflected beam reaches the photo-detector 60 through the reflection by the beam splitter 36. Thus, the photo-detector 60 can recognize whether or not a pit exists on the medium 28. In the above embodiment, the quarter wavelength plate 8 functions to convert the input wave to circular polarization. It should be noted that the reflection beam in reading out the data passes that quarter wavelength plate 38 twice, and then, the total rotation of the plane of polarization is 90°. Therefore, the reflection beam $N_2$ is reflected by the beam splitter 36 and the reflection beam $N_2$ reaches the photo-detector 60.

It should be appreciated in FIG. 6 that the moving speed of the recording medium 28 is slow so that the rear portion of each pit overlaps with the head portion of the next pit as described in accordance with FIGS. 3A and 3B. Further, due to the presence of the opening 40, the rear portion of the beam is shaded, and therefore, the border of the rear portion of a pit is clarified.

From the foregoing it will now be apparent that a new and improved optical recording system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical recording system comprising a laser beam source; modulation means for modulating the intensity of the laser beam of said laser beam source; separation means which passes the beam from said laser beam source but separates a reflection beam in the opposite direction; means for converting optical energy to electrical energy to provide reproduced signal according to the separated reflection beam from said separation means; focusing lens for focusing the beam on the surface of the recording medium; wherein said recording medium is made of heat-meltable material which is melted by illuminating a laser beam to provide a pit corresponding to data to be stored; and wherein relative movement of said recording medium to the laser beam is such that the spacing between each adjacent pit in the relative movement direction of a recording medium and a laser spot on the recording medium is less than a diameter of a laser spot, which is defined by the threshold value of the energy of the laser beam for melting the recording medium.

2. An optical recording system according to claim 1, wherein the spacing between two adjacent pits is in the range between ⅓ and ½ of the diameter of said laser spot.

3. An optical recording system according to claim 1, wherein a rear portion of said laser beam along the moving direction of the relative movement of the laser beam to the recording medium is shaded.

4. An optical recording system according to claim 1, wherein said recording medium is styrene-olygomer.

5. An optical recording system according to claim 1, wherein a recording track is provided in a concaved channel defined by a pair of edges of said channel, the level of said edges being higher than that of said channel.

* * * * *